Figure 4:
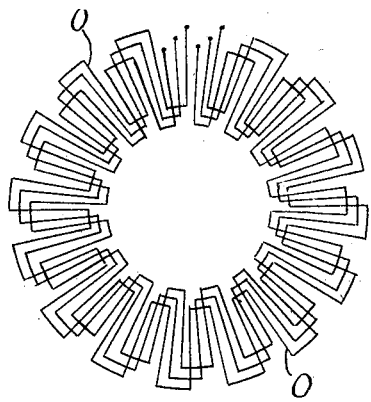

No. 748,215. PATENTED DEC. 29, 1903.
E. H. PORTER & B. CURRIER.
TURBINE ELECTRIC GENERATOR.
APPLICATION FILED SEPT. 14, 1903.
NO MODEL. 4 SHEETS—SHEET 1.
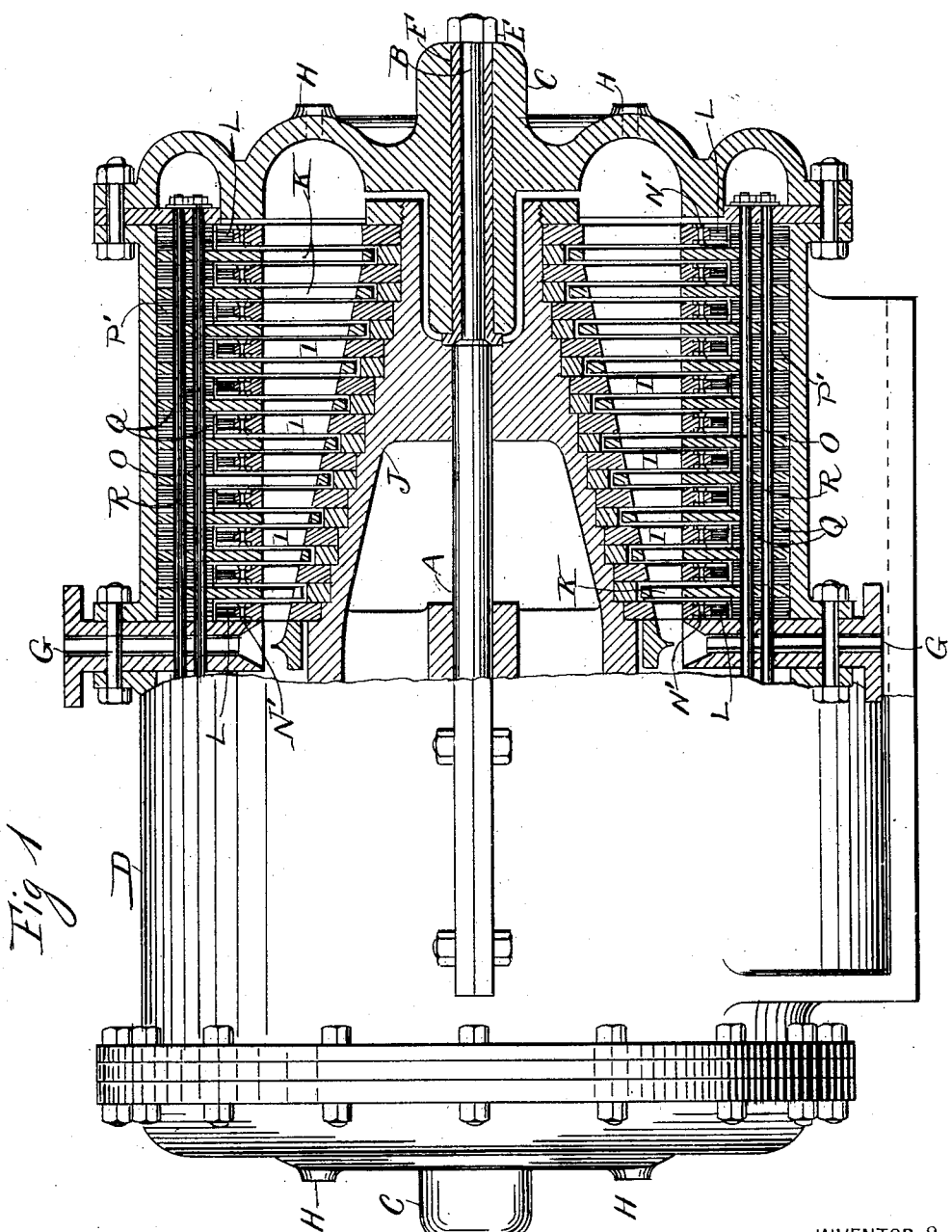

No. 748,215. PATENTED DEC. 29, 1903.
E. H. PORTER & B. CURRIER.
TURBINE ELECTRIC GENERATOR.
APPLICATION FILED SEPT. 14, 1903.
NO MODEL. 4 SHEETS—SHEET 2.
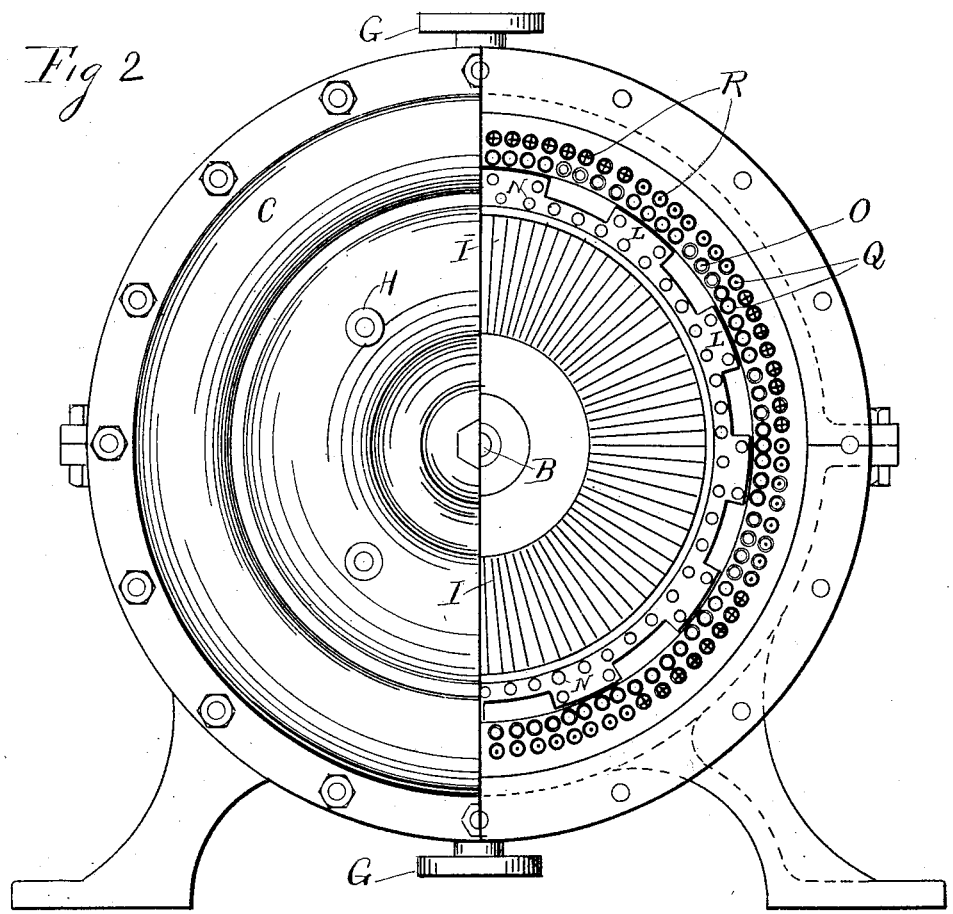
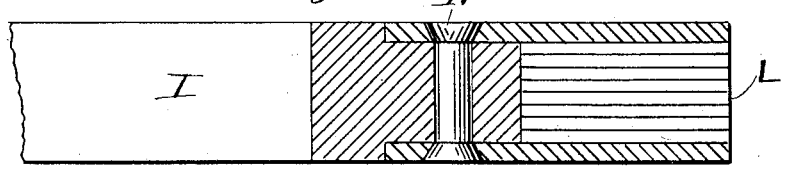

No. 748,215. PATENTED DEC. 29, 1903.
E. H. PORTER & B. CURRIER.
TURBINE ELECTRIC GENERATOR.
APPLICATION FILED SEPT. 14, 1903.

NO MODEL. 4 SHEETS—SHEET 3.

No. 748,215. PATENTED DEC. 29, 1903.
E. H. PORTER & B. CURRIER.
TURBINE ELECTRIC GENERATOR.
APPLICATION FILED SEPT. 14, 1903.
NO MODEL. 4 SHEETS—SHEET 4.
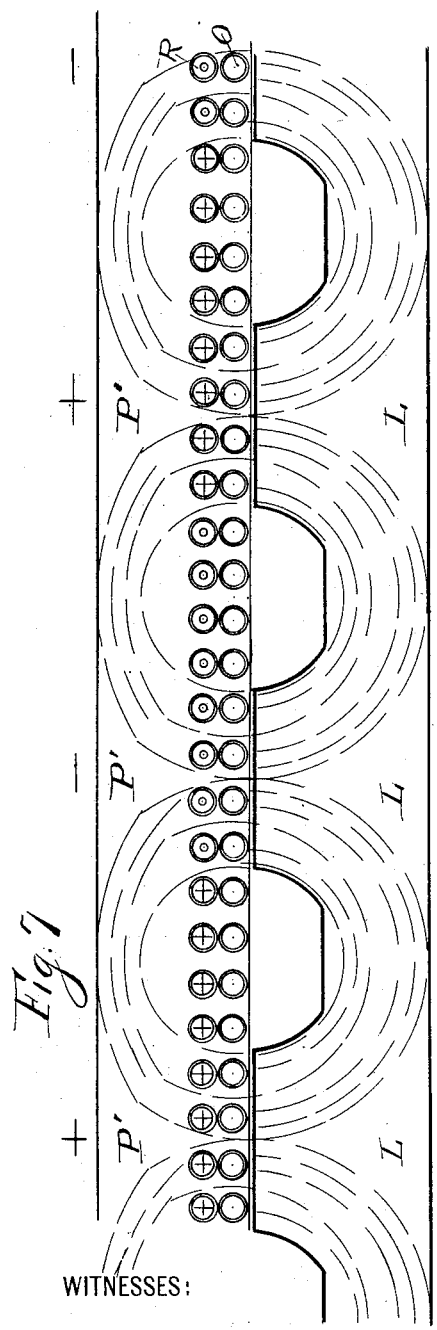
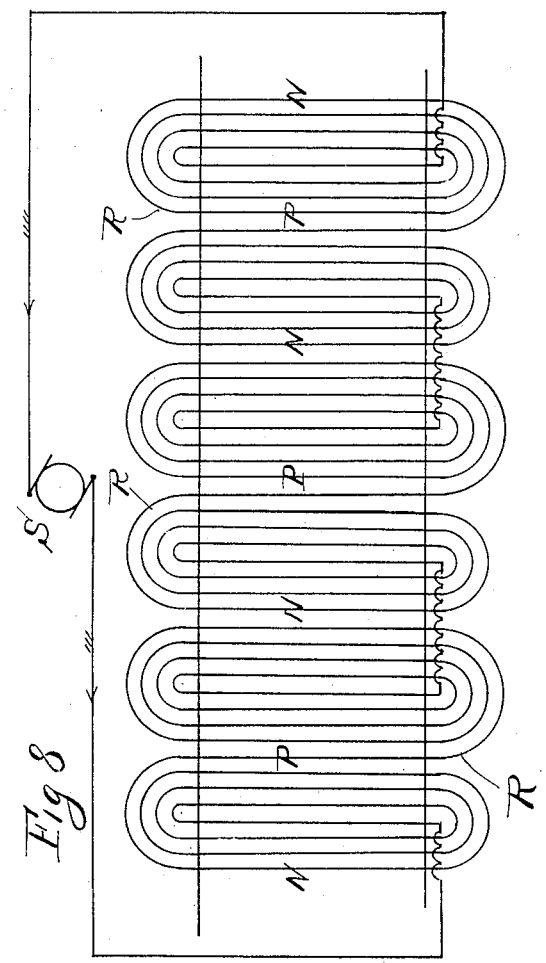

No. 748,215. Patented December 29, 1903.

UNITED STATES PATENT OFFICE.

EDWIN HITCHINS PORTER AND BURLEIGH CURRIER, OF PHILADELPHIA, PENNSYLVANIA.

TURBINE ELECTRIC GENERATOR.

SPECIFICATION forming part of Letters Patent No. 748,215, dated December 29, 1903.

Application filed September 14, 1903. Serial No. 173,132. (No model.)

*To all whom it may concern:*

Be it known that we, EDWIN HITCHINS PORTER and BURLEIGH CURRIER, citizens of the United States of America, and residents of Philadelphia, in the county of Philadelphia and State of Pennsylvania, have invented certain new and useful Improvements in Turbine Electric Generators, of which the following is a specification.

Our invention relates to an electric generator, but more particularly to novel means for generating electricity by the action of steam or other gas under pressure.

Heretofore it has been common to couple up a dynamo to the shaft of a steam-turbine. Our conception consists in providing a cylinder with heads at both ends and locating therein the turbine and elements of an electric generator, whereby several objections to the old plan are removed. For example, the shaft of the turbine may be smaller where it passes into the bearings than in the old arrangement, other things being the same. Furthermore, the ends of the shaft need not extend through the bearings, but only part way into the same, and the bearings may be plugged up, thereby preventing all leakage of steam. Besides these advantages the machine occupies little more than half of the space taken up by the old combination. The weight is also much less. All heat generated in the magnetic or electrical conductors by the operation of the generator is returned to the steam, and so not radiated to the external air, keeping the conductors at the temperature of steam, thereby allowing high efficiency and heavy overloads, the heat generated in the magnetic and electric conductors also acting to keep the temperature of the vanes and other metal parts at a higher temperature than in ordinary steam-turbines, giving less condensation, and therefore higher efficiency in the turbine itself.

The organization by which we secure the several advantages consists of the following elements: a cylinder whose heads support bearings, a turbine the ends of whose shafts extend into said bearings, but not through the same, plugs inserted into the bearings for preventing any escape of steam, and dynamo elements—namely, an inductor and armature. The inductor is carried on the peripheries of the vanes of the turbine, and the armature is built upon the interior surfaces of the cylinder within close proximity of the inductor of the generator. Of course admission and exhaust ports are provided.

More generally stated, the invention consists of a cylinder, an element inside thereof adapted to be rotated by steam or other gas under pressure, and an inductor and armature of an electric generator carried, respectively, by said element and said cylinder.

This invention differs from that of our former application, Serial No. 126,635, in that the induction or asynchronous type of generator employing the squirrel-cage rotor was there used, where in the present invention the toothed inductor type of generator is used, the laminated iron inductor being mounted on the periphery of the turbine-blades. The armature and its generating-winding is mounted on the cylinder within inductive relation of the rotating inductor. The separately-excited magnetizing-winding is located adjacent to the generating-winding, being shown in the drawings behind the same, (except Fig. 6,) but may be located either behind, in front of, or beside it in the same slot or in separate adjacent slots.

The principle upon which this generator operates is the well-known inductor type of generator as built by Mordey, Kingdon, Thompson, and others, shown and described on pages 641 to 644, inclusive, of *Dynamo Electric Machinery,* by S. P. Thompson, eighth American edition, published by M. Strong, 161 Bank street, New York city.

Our invention as described consists in using a modified type of this generator inside the turbine casing or cylinder, making use of a number of inductors acting in parallel in inductive relation between the two stationary windings.

The invention is described by reference to the accompanying drawings.

Figure 5:
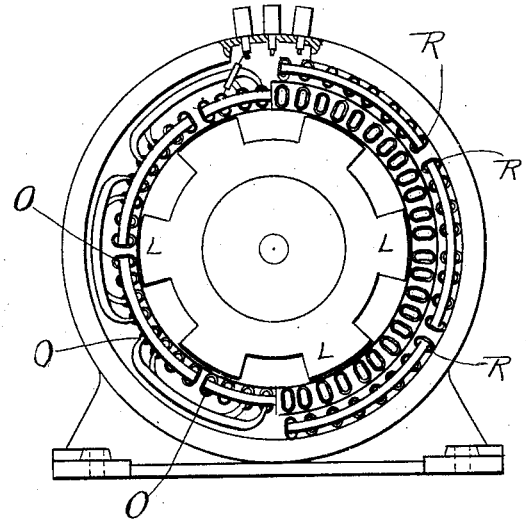
Figure 6:
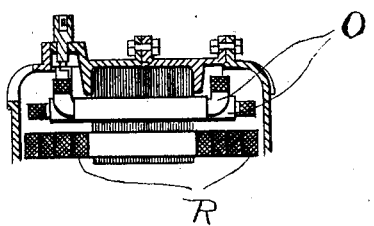

Figure 1 is a general side elevation shown partly in exterior and partly by central longitudinal sections. Fig. 2 is an end elevation, one half of which is exterior and the other half a diagram or outline of the main elements. Fig. 3 is a section through one of the laminated teeth of the inductor on an enlarged scale. Fig. 4 is a diagram showing the principle upon which the conductors are arranged in the armature or stator, the radial lines representing the bars O. It is immaterial how many poles the armature or stator has. Fig. 4 shows a different number from what the generator in Figs. 1 and 2 has. Each conductor O in Figs. 1 and 2 corresponds to one radial line in Fig. 4. Further explanation of these windings, which have nothing to do with our invention, may be found in S. P. Thompson's treatise, *Polyphase Electric Currents*, edition of 1900, and published by E. & F. Spon, London, and Spon & Chamberlain, New York, Fig. 347, and the explanations thereof. Fig. 5 serves to show in elevation the general connections for grouping the stator-conductors O. In Fig. 5 is also shown the location of another winding R, to be used as a separately-excited winding for producing a magnetic flux through the first-mentioned winding. Fig. 5 also shows the teeth of the inductor, which by revolving adjacent to the two mentioned windings varies the magnetic flux through the first-named winding, which flux is produced by the second winding. The number of poles would be different in Fig. 5 also, which shows a six-pole three-phase combination of circuits. In Fig. 5 the number of conductors O in the whole circle is not the same as shown in Fig. 4. Further explanation of the grouping of the stator-conductors, both separately-excited and generating conductors, may be found in the same book referred to above. Fig. 6 is a cross-section of the upper part of the stator shown in Fig. 5, the section showing the relation of the separately-excited and generating windings. Fig. 7 is a diagrammatic view showing the relation of the iron laminations of the stator or armature carrying the two windings and those of the inductor, the magnetic flux being indicated for one position of the indicator by the broken lines. Fig. 8 is a diagram of a well-known grouping of conductors, showing how the separately-excited winding may be composed of the bars R mentioned, suitably connected together and to an external source of current, as S, to produce the required exciting magnetic flux. This diagram could be the same as used in direct-current multipolar armature connections, as are thoroughly described in the book previously mentioned.

A is the shaft of the turbine, having reduced ends B extending into but not through the head C of the cylinder D.

E represents screw-plugs for closing the bearings, thereby preventing leakage of steam, the bearings being represented by the bushings F, located in holes in the heads C.

The admission-ports are G and the exhaust-ports are at H.

The rotary vanes are lettered I and are carried by the spider J on the shaft A.

K represents stationary vanes, located, respectively, between the rotary vanes and extending inwardly and radially from and supported by the cylinder D.

Upon the peripheries of the rotary vanes are located iron inductors L of the toothed type laminated in the usual manner and secured to said peripheries by rivets N'.

The armature or stator consists of the electric conductors O and R, respectively, acting also as bolts, and laminated-iron rings P', through which said conductors pass from one end of the cylinder to the other and surrounded by fireproof insulating-tubes Q. The laminated-iron rings P' form cylindrical surfaces close to the outer cylindrical surfaces of the individual rotors at L, there being air-gaps between the two elements of the generator.

The operation consists simply in admitting steam and driving the turbine in the usual manner, whereby the inductors at L are rotated within inductive distance of the armature or stator. The teeth of the rotating inductor L varies the magnetic flux through the generating-winding O. The steam enters the turbine at the ports G, strikes the movable vanes I and stationary vanes K alternately in its course through the turbine in both lateral directions from the middle thereof, and then the steam has its exit at the ports H on opposite ends of the turbine.

The electrical connections are not shown, as they may be varied and are well known in the art to which this invention appertains and because our invention relates to the mechanical construction rather than to any new electric system of distribution.

We claim as our invention—

1. The combination of a cylinder having admission and exhaust ports, heads therefor, shaft-bearings supported by said heads, a shaft in said bearings, a hub upon said shaft within said cylinder, sets of vanes radiating from and supported by said hub, inductors of a generator carried upon said vanes, stationary vanes supported by said cylinder between every two sets of the first-named vanes, two groups of electric conductors extending lengthwise of the cylinder within the same and within inductive action of the inductors, one of said groups being separately excited and the other being the generating-winding, and laminated-iron plates for the inductors and armature, the inductors having a magnetically-toothed surface at the periphery of the rotary element, and the laminated plates of the armature within the cylinder and having cylindrical surfaces just escaping the surfaces of the inductors.

2. The combination of a cylinder having admission and exhaust ports, heads therefor, shaft-bearings supported by said heads, a shaft in said bearings, a hub upon said shaft within said cylinder, sets of vanes radiating from and supported by said hub, inductors of a generator carried upon said vanes, stationary vanes supported by said cylinder between every two sets of the first-named vanes, two groups of electric conductors extending lengthwise of the cylinder within the same and within inductive action of the inductors, one of said groups being separately excited and the other being the generating-winding, laminated-iron plates for the inductors and armature, the inductors having a magnetically-toothed surface at the periphery of the rotary element, and the laminated plates of the armature within the cylinder and having cylindrical surfaces just escaping the surfaces of the inductors, and fireproof insulating-tubes surrounding said conductors, said generating-conductors being connected together and to other conductors outside of the cylinder, and said separately-excited conductors being connected together and to an external source of current.

3. The combination of a cylindrical stationary armature of an electric generator, heads therefor by which a closed cylinder is formed, said cylinder having ports, a generating-winding and an exciting-winding for said armature, a rotary magnetically-toothed inductor for said generator, movable turbine-vanes carried by said inductor, and stationary turbine-vanes on said cylinder coöperating with said movable vanes, said vanes and said inductor being located within said cylinder.

4. The combination of a closed cylinder or casing having ports, said cylinder being a common element of both an elastic-fluid turbine and of an electric generator, a rotary laminated and magnetically-toothed inductor for the generator, a stationary laminated armature for the generator, an exciting-winding and a generating-winding for said armature, and a rotary and a fixed part for the turbine, all located within said cylinder.

5. The combination of a closed cylinder or casing having ports, said cylinder being a common element of both an elastic-fluid turbine and of an electric generator, a rotary laminated and magnetically-toothed inductor for the generator, a stationary laminated armature for the generator, an exciting-winding and a generating-winding for said armature, and a rotary and a fixed part for the turbine, all located within said cylinder, the turbine elements and the generator elements, being arranged respectively concentric to each other, the generator elements being disposed adjoining the common casing and on the outside of and surrounding the turbine elements, and the inductor of the generator being rigidly attached to the circumference of the rotary part of the turbine.

In testimony whereof we have hereunto subscribed our hands and affixed our seals this 11th day of September, 1903.

EDWIN HITCHINS PORTER. [L. S.]
    BURLEIGH CURRIER. [L. S.]

Witnesses:
 FRANCIS C. ADLER,
 BESSIE D. RHODES.